United States Patent
Lee et al.

(10) Patent No.: US 11,518,373 B2
(45) Date of Patent: Dec. 6, 2022

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: KyoungJun Lee, Seoul (KR); Daeyoung Kim, Gwangmyeong-si (KR); Seungjoon Lee, Seoul (KR); Donggu Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 256 days.

(21) Appl. No.: 16/841,437

(22) Filed: Apr. 6, 2020

(65) Prior Publication Data
US 2021/0122366 A1   Apr. 29, 2021

(30) Foreign Application Priority Data
Oct. 29, 2019   (KR) .................. 10-2019-0135158

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 40/09* (2013.01); *B60W 50/14* (2013.01); *B60W 60/005* (2020.02); *B60W 60/0059* (2020.02); *B60W 60/0061* (2020.02); *B60W 2040/0827* (2013.01); *B60W 2520/10* (2013.01);
(Continued)

(58) Field of Classification Search
CPC ...... B60W 30/09; B60W 10/18; B60W 40/09; B60W 50/14; B60W 2040/0827; B60W 2520/10; B60W 2540/229; B60W 2710/18; B60W 2720/103; B60W 2050/143; B60W 30/146; B60W 2540/30; B60W 2720/10; B60W 30/143; B60W 30/08; B60W 40/08; B60W 40/105; B60W 50/10; B60W 2040/0818; B60W 2050/146; B60W 60/005; B60W 60/0059; B60W 60/006;
(Continued)

(56) References Cited

U.S. PATENT DOCUMENTS

| | | | |
|---|---|---|---|
| 9,676,395 B2 * | 6/2017 | Siddiqui | G06F 21/32 |
| 2005/0030184 A1 * | 2/2005 | Victor | B60K 35/00 |
| | | | 340/576 |
| 2016/0001781 A1 * | 1/2016 | Fung | G16H 50/20 |
| | | | 701/36 |

FOREIGN PATENT DOCUMENTS

| | | |
|---|---|---|
| JP | 2006347508 A | 12/2006 |
| KR | 101794431 B1 | 11/2017 |

* cited by examiner

*Primary Examiner* — Jason Holloway
(74) *Attorney, Agent, or Firm* — Lempia Summerfield Katz LLC

(57) ABSTRACT

A vehicle includes: a driver assistance system; an accelerator configured to perform acceleration of the vehicle; a braking device configured to perform deceleration of the vehicle; a velocity sensor configured to detect a current velocity of the vehicle; a driver status sensor configured to acquire a driver's behavioral data; and a controller. The controller is configured to identify a carelessness status of the driver based on the driver's behavioral data and to activate a (Continued)

velocity control mode when the carelessness status of the driver is detected in the activation status of the driver assistance system.

10 Claims, 5 Drawing Sheets

(51) Int. Cl.
  *B60W 50/14* (2020.01)
  *B60W 40/09* (2012.01)
  *B60W 60/00* (2020.01)
  *B60W 40/08* (2012.01)
(52) U.S. Cl.
  CPC ... *B60W 2540/229* (2020.02); *B60W 2710/18* (2013.01); *B60W 2720/103* (2013.01)
(58) Field of Classification Search
  CPC .......... B60Y 2300/08; B60Y 2300/143; B60Y 2400/303
  See application file for complete search history.

VEHICLE AND CONTROL METHOD THEREOF

CROSS-REFERENCE TO RELATED APPLICATION

This application is based on and claims priority under 35 U.S.C. § 119 to Korean Patent Application No. 10-2019-0135158, filed on Oct. 29, 2019 in the Korean Intellectual Property Office, the disclosure of which is incorporated herein by reference.

BACKGROUND

1. Field

The disclosure relates to a vehicle that prevents a collision and minimizes damage when a carelessness status of a driver is detected, and to a control method thereof.

2. Description of the Related Art

A vehicle may include a driver assistance system (DAS). The driver assistance system is a system that assists the driver in driving and provides various functions. In particular, the driver assistance system may provide Lane Keeping Assist and Smart Cruise Control. In addition, the driver assistance system may also include a highway driving assist function.

The Highway Driving Assist (HDA) function recognizes distance with vehicle ahead and lanes on the highway, allowing the vehicle to maintain and supplement its current driving conditions. When it is determined that the vehicle has entered the highway in conjunction with the navigation, the HDA maintains the lane as well as maintains the distance between the vehicle ahead and control the velocity, helping the driver to drive comfortably. In other words, HDA combines smart cruise control with lane keeping assistance.

On the other hand, if the driver engages in a carelessness status, for example, the driver does not touch the steering wheel, safety may be lowered. Commercial vehicles provide a warning when a driver's hands off situation is detected and disable some of the functions provided by the driver assistance system. The HDA stops working in the hands off situation.

However, the driving operation of the driver may not be performed even when some functions of the driver assistance system are stopped. In this case, a vehicle collision and an accident may occur. The prior art does not suggest a way to control the vehicle when the driving operation of the driver is not continuously performed. Therefore, there is a high probability of a collision and an accident for the vehicle.

SUMMARY

Therefore, it is an aspect of the present disclosure to provide a vehicle and a control method for providing a warning by detecting the driver's carelessness status and controlling a vehicle's velocity to prevent a collision and minimize damage in a situation where the driver's carelessness status is detected.

More specifically, it is an aspect of the present disclosure to provide a vehicle and a control method for changing the limit velocity depending on deceleration by a driver assistance system when the driver's carelessness status is detected and for controlling the velocity of the vehicle so as not to exceed the changed limit velocity.

In accordance with one aspect of the disclosure, a vehicle includes: a driver assistance system; an accelerator configured to perform acceleration of the vehicle; a braking device or brake system configured to perform deceleration of the vehicle; a velocity sensor configured to detect a current velocity of the vehicle; a driver status sensor configured to acquire a driver's behavioral data; and a controller. The controller is configured to identify a carelessness status of the driver based on the driver's behavioral data and to activate a velocity control mode to control the accelerator and/or the braking device when the carelessness status of the driver is detected in the activation status of the driver assistance system.

The controller may be configured to determine a limit velocity of the vehicle according to activation of the velocity control mode. The controller may be configured to control at least one of the accelerator and/or the braking device based on the limit velocity.

The controller may be configured to deactivate the velocity control mode when the driving will of the driver is detected after the carelessness status of the driver is detected.

The controller may be configured to compare a set velocity by the driver, a predetermined reference velocity and the current velocity and determine the limit velocity based on the comparison result.

The controller may be configured to determine whether the deceleration is performed by the driver assistance system when the current velocity becomes smaller than the limit velocity due to deceleration while driving at the limit velocity and change the limit velocity to a decelerated current velocity when the deceleration is performed by the driver assistance system.

The controller may be configured to determine a smallest value among the set velocity, the reference velocity, and the current velocity as the limit velocity.

The vehicle may further include: a warning device configured to provide at least one of a visual warning; an auditory warning; and a tactile warning. The controller may be configured to control the warning device to output at least one of a visual warning, an auditory warning and a tactile warning about the carelessness status of the driver.

The controller may be configured to identify at least one of a case in which a hands off situation from a steering wheel is detected, a case in which a drowsiness state of the driver is detected, and a case in which the driver does not look ahead for a predetermined time as the carelessness status of the driver.

In accordance with one aspect of the disclosure, a control method of a vehicle includes: checking an activation status of a driver assistance system; acquiring a driver's behavioral data; identifying a carelessness status of the driver based on the driver's behavioral data; and activating a velocity control mode to control at least one of an accelerator and/or a braking device when the carelessness status of the driver is detected.

The control method may further include determining a limit velocity of the vehicle and controlling at least one of the accelerator and/or the braking device based on the limit velocity.

The control method may further include deactivating the velocity control mode when the driving will of the driver is detected after the carelessness status of the driver is detected.

The determining the limit velocity of the vehicle may include: comparing a set velocity by the driver, a predetermined reference velocity and the current velocity; and determining the limit velocity based on the comparison result.

The control method may further include: determining whether the deceleration is performed by the driver assistance system when the current velocity becomes smaller than the limit velocity due to deceleration while driving at the limit velocity; and changing the limit velocity to a decelerated current velocity when the deceleration is performed by the driver assistance system.

The determining the limit velocity of the vehicle may include determining a smallest value among the set velocity, the reference velocity, and the current velocity as the limit velocity.

The control method may further include controlling the warning device to output at least one of a visual warning, an auditory warning and a tactile warning about the carelessness status of the driver.

The identifying the carelessness status of the driver may include identifying at least one of a case in which a hands off situation from a steering wheel is detected, a case in which a drowsiness state of the driver is detected, and a case in which the driver does not look ahead for a predetermined time as the carelessness status of the driver.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
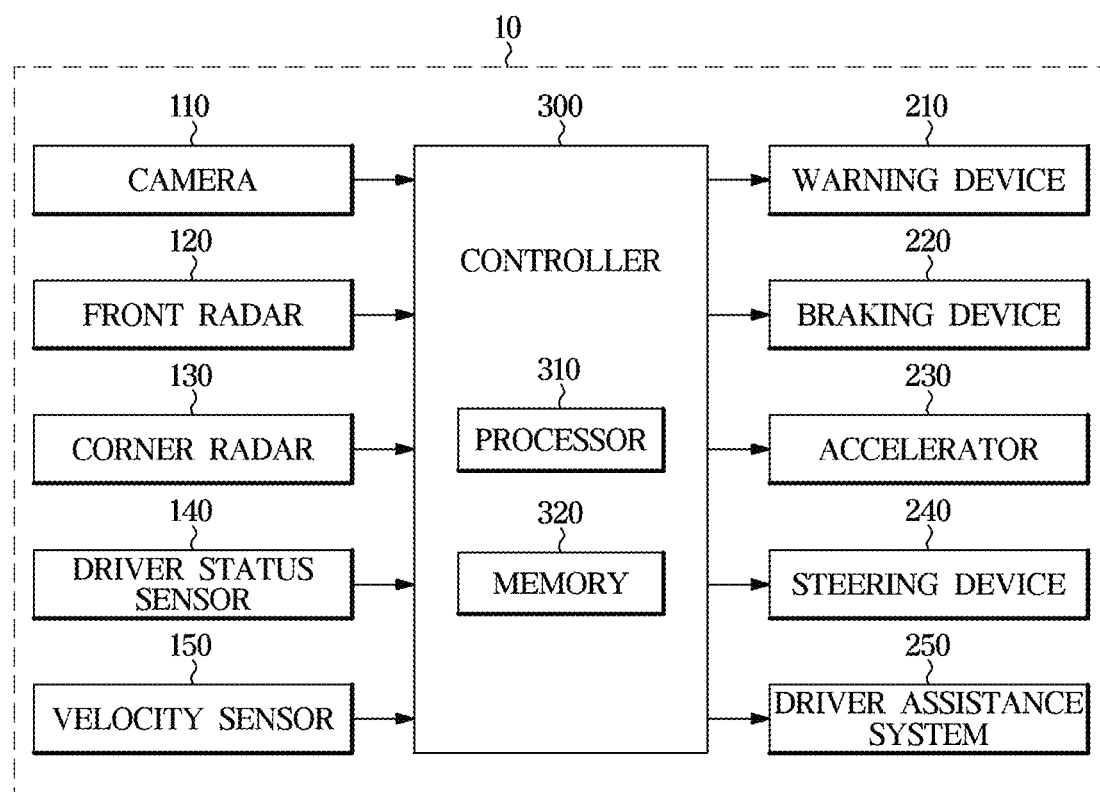
FIG. 1 illustrates a control block diagram of a vehicle according to an embodiment of the disclosure.

Like reference numerals refer to like elements throughout the specification. Not all elements of embodiments of the disclosure are described, and description of what are commonly known in the art or what overlap each other in the embodiments are be omitted. The terms as used throughout the specification, such as "~part," "~module," "~member," "~block," etc., may be implemented in software and/or hardware, and a plurality of "~parts," "~modules," "~members," or "blocks" may be implemented in a single element, or a single "~part," "~module," "~member," or "~block" may include a plurality of elements.

It should be understood that when an element is referred to as being "connected" to another element, it can be directly or indirectly connected to the other element. The indirect connection may include a "connection" via a wireless communication network.

Also, when a part "includes" or "comprises" an element, unless there is a particular description contrary thereto, the part may further include other elements, not excluding the other elements.

It should be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Throughout the specification, terms such as "surrounding", "nearby", and the like refers to elements or objects in relatively close proximity to the vehicle.

Hereinafter, the operation principles and embodiments of the disclosure are described with reference to the accompanying drawings.

FIG. 1 illustrates a control block diagram of a vehicle according to an embodiment of the disclosure.

Referring to FIG. 1, the vehicle 10 according to an embodiment includes a camera 110, a front radar 120, a corner radar 130, a driver status sensor 140, a velocity sensor 150, a warning device 210, a braking device or braking system 220, an accelerator 230, a steering device 240, a driver assistance system (DAS) 250 and a controller 300. The controller 300 may be electrically connected to various devices included in the vehicle 10 and may control the devices.

The vehicle 10 also includes an engine and a transmission. The engine includes a cylinder and a piston. The engine can generate power for the vehicle 10 to travel. The transmission includes a plurality of gears and can transmit power generated by the engine to the wheels. The braking device 220 may slow down the vehicle 10 or stop the vehicle 10 through friction with the wheels. The steering device 230 may change the driving direction of the vehicle 10.

The vehicle 10 may include a plurality of electronic components. For example, the vehicle 10 may further include an engine management system (EMS), a transmission control unit (TCU), an electronic brake control module, an electronic steering device (Electronic Power Steering, EPS) and a body control module (BCM).

The EMS may control the engine in response to the driver's acceleration will through the accelerator pedal or a request from the driver assistance system. Throughout the specification, the driver's will may refer to the intention of the driver to perform various actions, i.e., drive, brake, or accelerate the vehicle. In an example, the engine management system can control the torque of the engine.

The TCU may control the transmission in response to the driver's shift command through the shift lever and/or the traveling velocity of the vehicle 10. In an example, the transmission control unit may adjust the shift ratio from the engine to the wheels.

The accelerator 230 may be defined to include or to cooperate with an engine, a transmission, an EMS and a TCU. In addition, the accelerator 230 may include an accelerator pedal.

The electronic brake control module may control the braking device 220 in response to the driver's braking will through the brake pedal and/or slip of the wheels. In an example, the electronic brake control module may temporarily release the braking of a wheel in response to the slip of the wheel detected when the vehicle 10 is braked (such as by an Anti-lock Braking System, ABS). The electronic brake control module may selectively release the braking of the wheel in response to oversteering and/or understeering detected during steering of the vehicle 10 (such as by Electronic Stability Control, ESC). In addition, the electronic brake control module may temporarily brake the wheel in response to the slip of the wheel detected when the vehicle 10 is driven (such as by a Traction Control System, TCS).

The electronic steering device may assist the operation of the steering device 240 to allow the driver to easily operate the steering wheel in response to the driver's steering intention through the steering wheel. For example, the electronic steering device may assist the operation of the steering device 240 to reduce steering force at low speeds or parking and increase steering force at high speeds.

The body control module can control the operation of electrical components that provide convenience to the driver or ensure the safety of the driver. In an example, the body control module may control an airbag device, a head lamp, a wiper, a cluster, a multifunction switch, a direction lamp, and the like.

The driver assistance system 250 may assist the driver in manipulating (driving, braking, steering) the vehicle 10. For example, the driver assistance system 250 may detect an environment around the vehicle 10 (e.g., another vehicle, a pedestrian, a cyclist, a lane, a road sign, and the like). The driver assistance system 250 may control driving and/or braking and/or steering of the vehicle 10 in response to the detected environment.

The driver assistance system 250 may provide various functions to the driver. For example, the driver assistance system 250 may provide at least one of Lane Departure Warning (LDW), Lane Keeping Assist (LKA), High Beam Assist (HBA), Autonomous Emergency Braking (AEB), Traffic Sign Recognition (TSR), Smart Cruise Control (SCC), Highway Driving Assist (HDA), and Blind Spot Detection (BSD).

The vehicle 10 may be provided with a switch and/or a button for operating the driver assistance system 250. In an example, the steering wheel of the vehicle 10 may be provided with a smart cruise control (SCC) ON/OFF switch, a velocity setting switch, and a distance setting switch for operating the SCC.

The camera 110 may photograph the front and recognize other vehicles, pedestrians, cyclists, lanes, road signs, and the like. The front radar 120 and the corner radar 130 may acquire a relative position, a relative velocity, and the like of surrounding objects (e.g., other vehicles, pedestrians, cyclists, and the like). The front radar 120 and the corner radar 130 may be implemented in Lidar.

The driver status sensor 140 may acquire behavioral data of the driver. The driver status sensor 140 may be provided in various forms inside the vehicle 10. In an example, the driver status sensor 140 may include at least one of a hands off sensor that detects when a driver's hands are off a steering wheel, a galvanic skin response (GSR) sensor that measures a skin electrical conductivity of a user, a skin temperature sensor that measures the user's skin temperature, a heart rate (HR) sensor that measures the heart rate of the user, an electroencephalogram (EEG) sensor that measures the brain waves of the user, a speech recognition sensor that measures a user's speech signal, a face analysis device capable of analyzing the facial expression of the user and an eye tracker to track the position of the pupil of the user. The driver status sensor 140 is not limited to those noted above or shown or described herein.

The hands off sensor may detect when the driver's hands are off the steering wheel, i.e., a hands off situation. The hands off sensor may detect when the driver's hands are off the steering wheel by measuring capacitance using a conductive material provided on the steering wheel. In addition, the hands off sensor may quickly determine whether the driver is holding the steering wheel with both hands and transmit a hands off detection signal to the controller 300.

In addition, the hands off sensor may detect when the driver's hands are off the steering wheel using various methods. In an example, the hands off sensor may measure the steering torque and detect when the hands are off the steering wheel when the measured steering torque is less than the reference torque.

The velocity sensor 150 may detect the velocity of the wheel and/or the velocity of the vehicle 10. On the other hand, the vehicle 10 may be provided with various sensors for acquiring the behavior information of the vehicle. In an example, the vehicle 10 may further include: a lateral acceleration sensor for detecting the lateral acceleration of the vehicle; a yaw rate sensor for detecting the change in the angular velocity of the vehicle; a gyro sensor for detecting the tilt of the vehicle; and a steering angle sensor for detecting steering wheel rotation and steering angle.

The warning device 210 may provide at least one of a visual warning, an auditory warning, and a tactile warning. The controller 300 may control the warning device 210 to provide a warning when a carelessness status of the driver is detected for a predetermined time. The controller 300 may control the warning device 210 to output at least one of a visual warning, an auditory warning, and a tactile warning regarding the carelessness status of the driver. In an example, the warning device 210 may output a warning message including at least one of a text, a voice, and an image through an audio device and/or a display device. The warning about the carelessness status of the driver may be output for a predetermined warning time.

The above-described configurations may communicate with each other via a vehicle communication network (NT). For example, the components of the vehicle 10 may transmit and receive data via Ethernet, Media Oriented Systems Transport (MOST), FlexRay, Controller Area Network (CAN), and Local Interconnect Network (LIN).

The controller 300 includes a processor 310 and a memory 320. The controller 300 may include one or more processors 310. The processor 310 may include an Image signal processor for processing the front image data of the front camera (110), a digital signal processor for processing radar data of radars 120 and 130, and micro control unit (MCU) to generate acceleration signals, braking signals and steering signals.

The memory 320 may store a program and/or data for processing the image data by the processor 310, a program and/or data for processing the radar data, and a program and/or data for the processor 310 to generate acceleration signals, brake signals and/or steering signals. In addition, the memory 320 may store a program that include computer-executable instructions for the processor 310 to execute and to operate the driver assistance system 250.

The memory 320 may temporarily store the image data received from the camera 110 and/or the radar data received from the radars 120 and 130. The memory 320 may temporarily store the processing result of the image data and/or radar data by the processor 310.

The memory 320 may include a nonvolatile memory such as a flash memory, a read only memory (ROM), an erasable programmable read only memory (EPROM), or the like, as well as a volatile memory such as an S-RAM and a D-RAM.

One or more processors 310 included in the controller 300 may be provided and integrated on one chip. When a plurality of processors 310 is provided, the plurality of processors 310 may be physically separated. In addition, the processor 310 and the memory 320 may be implemented as a single chip.

The controller 300 may process image data of the camera 110, front radar data of the front radar 120, and corner radar data of the corner radar 130. The controller 300 may process driver behavioral data of the driver status sensor 140 and velocity data of the velocity sensor 150. In addition, the controller 300 may generate a control signal for controlling the warning device 210, the braking device 220, the accelerator 230, the steering device 240, and the driver assistance system 250.

The controller 300 may identify an object around the vehicle 10 based on at least one of the image data and the radar data. In addition, the controller 300 may calculate a Time to Collision (TTC) with the object and determine a collision risk based on the TTC. The controller 300 may control the driver assistance system 250 and the braking device 220 based on the collision risk.

Figure 2:
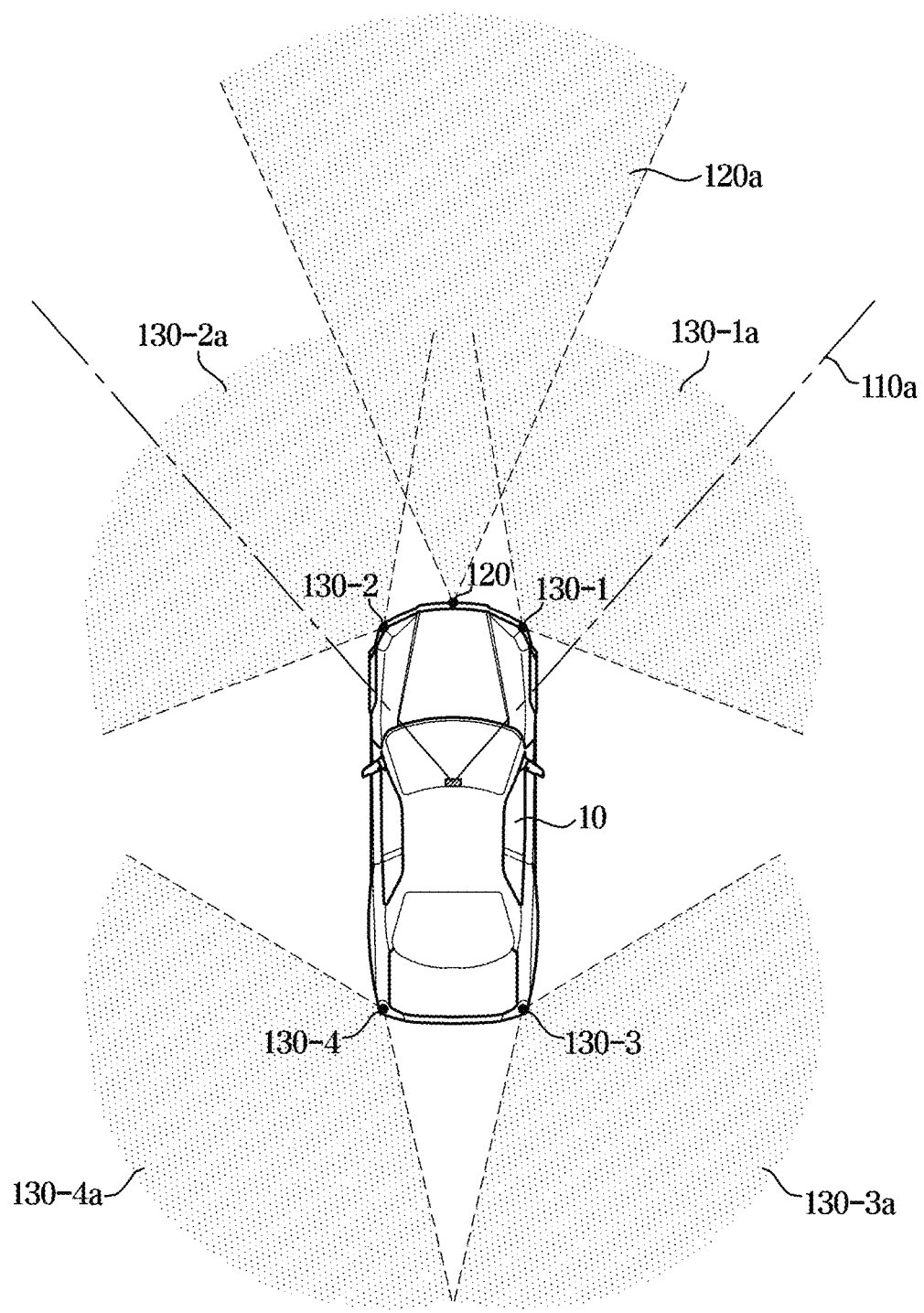
FIG. 2 illustrates a camera and a radar included in a vehicle according to an embodiment of the disclosure.

FIG. 2 illustrates a camera and a radar included in a vehicle according to an embodiment of the disclosure.

Referring to FIG. 2, the camera 110 may have a field of view 110a facing forward. The camera 110 may be installed in, for example, the front windshield of the vehicle 10. The camera 110 may photograph the front of the vehicle 10 and acquire image data of the front of the vehicle 10. The image data in front of the vehicle 10 may include location information about another vehicle or lane located in front of the vehicle 10.

The camera 110 may include a plurality of lenses and an image sensor. The image sensor may include a plurality of photo diodes for converting light into an electrical signal. The plurality of photo diodes may be arranged in a two-dimensional matrix.

The camera 110 may be electrically connected to the controller 300. In an example, the camera 110 may be connected to the controller 300 through a communication network NT for a vehicle, a hard wire, or a printed circuit board (PCB). The camera 110 may transmit image data in front of the vehicle 10 to the controller 300.

The front radar 120 may have a field of sensing 120a facing the front of the vehicle 10. The front radar 120 may be installed in, for example, a grill or bumper of the vehicle 10.

The front radar 120 may include a transmit antenna (or transmit antenna array, transmitting antenna, transmitter antenna, or the like) that radiates transmitted radio wave toward the front of the vehicle 10. The front radar 120 may include a receive antenna (or receive antenna array, receiving antenna, receiver antenna, or the like) that receives reflected radio wave reflected from an object. The front radar 120 may acquire front radar data from the transmitted radio wave transmitted by the transmitting antenna and the reflected radio wave received by the receive antenna. The front radar data may include distance information and velocity information of another vehicle located in front of the vehicle 10. The front radar 120 calculates a relative distance to the object based on the phase difference (or time difference) between the transmitted radio wave and the reflected radio wave. The front radar 120 calculates the relative velocity of the object based on the frequency difference between the transmitted radio wave and the reflected radio wave.

The front radar 120 may be connected to the controller 300 through, for example, a communication network NT for a vehicle or a hard wire or a printed circuit board. The front radar 120 may transmit front radar data to the controller 300.

The corner radars 130 may include: a first corner radar 130-1 installed at the front right side of the vehicle 10; a second corner radar 130-2 installed at the front left side of the vehicle 10; a third corner radar 130-3 installed at the rear right side of the vehicle 10; and a fourth corner radar 130-4 installed at the rear left side of the vehicle 10.

The first corner radar 130-1 may have a field of sensing 130-1a facing the front right side of the vehicle 10. The second corner radar 132 may have a field of sensing 130-2a facing the front left side of the vehicle 10. The third corner radar 130-3 may have afield of sensing 130-3a facing the rear right side of the vehicle 10. The fourth corner radar 130-4 may have a field of sensing 130-4a facing the rear left side of the vehicle 10.

Each of the corner radars 130 may include a transmit antenna and a receive antenna. The first, second, third, and fourth corner radars 130-1, 130-2, 130-3, and 130-4 respectively may acquire first corner radar data, second corner radar data, third corner radar data and fourth corner radar data. The first corner radar data may include distance information and velocity information about an object (another vehicle) located on the front right side of the vehicle 10. The second corner radar data may include distance information and velocity information of an object located on the front left of the vehicle 10. The third and fourth corner radar data may include distance information and velocity information of an object located on the rear right side of the vehicle 10 and the rear left side of the vehicle 10.

Each of the corner radars 130 may be connected to the controller 300 through a vehicle communication network NT or a hard wire or a printed circuit board. The first, second, third and fourth corner radars 130-1, 130-2, 130-3, and 130-4 respectively may transmit the first, second, third, and fourth corner radar data to the controller 300.

Figure 3:
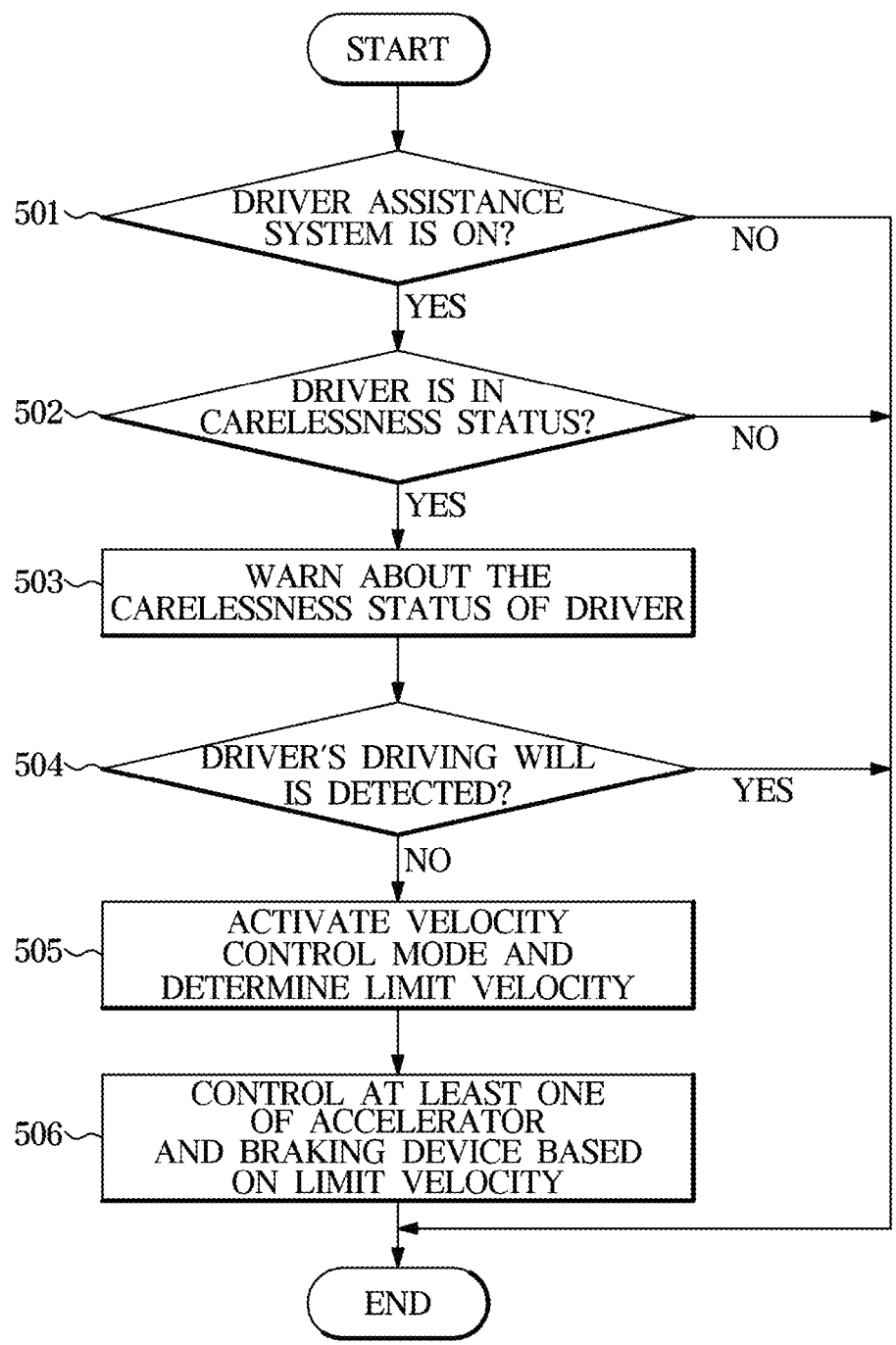
FIG. 3 illustrates a flowchart schematically describing a method of controlling a vehicle according to an embodiment of the disclosure.

FIG. 3 illustrates a flowchart schematically describing a method of controlling a vehicle according to an embodiment of the disclosure.

Referring to FIG. 3, the controller 300 of the vehicle 10 may check the activation status of the driver assistance system 250 (501). The activation status of the driver assistance system 250 may refer to a state in which the driver assistance system 250 is in operation and may be interpreted as being in an ON state. The activation status of the driver assistance system 250 may refer to a state in which at least one of a smart cruise control (SCC), a lane keeping assistance (LKA), and an HDA is activated.

The controller 300 may control the driver status sensor 140 to obtain driver behavioral data. The controller 300 may identify the drivers carelessness status based on the driver's behavioral data (502). The controller 300 may control the warning device 210 to output a warning about the carelessness status of the driver when the carelessness status of the driver is detected in the activation status of the driver assistance system (503). As described above, the warning device 210 may output at least one of a visual warning, an auditory warning, and a tactile warning regarding the carelessness status of the driver.

Subsequently, when the drivers driving will is not detected within a predetermined time, the controller 300 may activate the velocity control mode and determine the limit velocity of the vehicle 10 (504 and 505). The limit velocity determined in response to activation of the velocity control mode may be defined as a first limit velocity.

In FIG. 3, the velocity control mode is activated after the warning about the carelessness status of the driver is output, but is not limited thereto. In other words, the controller 300 may independently perform the warning regarding the carelessness status of the driver and entering to the velocity control mode. When the carelessness status of the driver continues for a predetermined time, the controller 300 may first activate the velocity control mode before controlling the warning device 210.

When the HDA is activated by the driver assistance system 250, the controller 300 may activate the velocity control mode after deactivating the highway HDA.

The drivers driving will may be detected in a variety of ways. For example, when the driver operates the steering wheel, the accelerator pedal, or the switch of the driver assistance system 250, the controller 300 may determine that the driver is willing to drive.

The controller 300 may control at least one of the accelerator 230 and the braking device 220 based on the determined limit velocity (506). In detail, the controller 300 may control at least one of the accelerator 230 and the braking device 220 such that the vehicle 10 travels at the limit velocity. The controller 300 may control the accelerator 230 to accelerate to the limit velocity when the current velocity of the vehicle 10 measured by the velocity sensor 150 is less than the limit velocity. In addition, the controller 300 may control the braking device 220 such that the current velocity does not exceed the limit velocity.

In this way, the collision of the vehicle 10 may be prevented by controlling the velocity of the vehicle 10 when the carelessness status of the driver is detected. Therefore, the damage may be minimized even when the collision occurs.

In contrast, when the driver assistance system 250 is in an inactivation status or when the driver's carelessness status is not detected, the controller 300 may not enter the velocity control mode. In addition, the controller 300 may not enter the velocity control mode when the driver's driving will is detected after the carelessness status of the driver is detected. The controller 300 may deactivate the velocity control mode when the driver's driving will is detected while the velocity control mode is activated. The determination of the limit velocity (first limit velocity) according to the activation of the velocity control mode is described in detail with reference to FIGS. 4 and 5.

Figure 4:
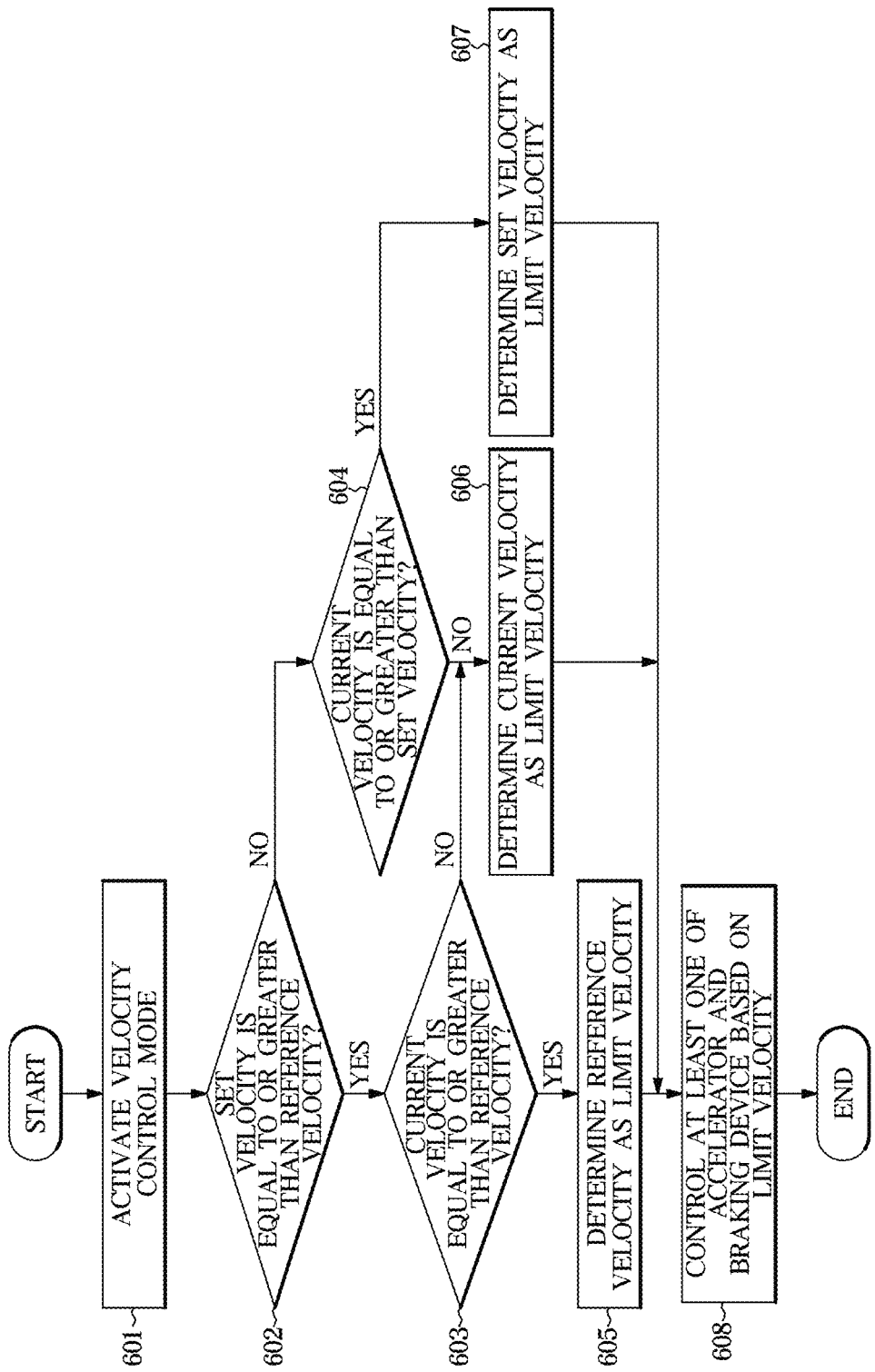
FIG. 4 illustrates a flowchart of a method of determining an initial velocity limit at the time of activation of velocity control by a control method of a vehicle according to an embodiment of the disclosure.

FIG. 4 illustrates a flowchart of a method of determining an initial velocity limit at the time of activation of velocity control by a control method of a vehicle according to an embodiment of the disclosure.

Referring to FIG. 4, when the carelessness status of the driver is detected in the activation status of the driver assistance system 250, the controller 300 activates the velocity control mode (601). Subsequently, the controller 300 may compare the set velocity by the driver, the predetermined reference velocity, and the current velocity, and determine the limit velocity (first limit velocity) based on the comparison result. The set velocity by the driver may refer to a target velocity of the SCC input by the driver. The reference velocity may refer to a velocity basically set by the driver assistance system 250. In an example, the reference velocity may be 60 km/h (37 mph).

The controller 300 may determine the smallest value among the set velocity, the reference velocity, and the current velocity as the limit velocity (first limit velocity). In detail, the controller 300 first compares the set velocity by the driver with a predetermined reference velocity (602). When the set velocity is equal to or greater than the reference velocity, the controller 300 compares the current velocity with the reference velocity (603). When the current velocity is greater than or equal to the reference velocity, the controller 300 determines the reference velocity as the limit velocity (605). In contrast, when the current velocity is smaller than the reference velocity, the controller 300 determines the current velocity as the limit velocity (606).

In other words, when the set velocity is greater than or equal to the reference velocity and the current velocity is greater than or equal to the reference velocity, the controller 300 determines the reference velocity as the limit velocity. When the set velocity is greater than or equal to the reference velocity and the current velocity is smaller than the reference velocity, the controller 300 determines the current velocity as the limit velocity.

When the set velocity is smaller than the reference velocity, the controller 300 compares the current velocity with the set velocity (604). When the current velocity is greater than or equal to the set velocity, the controller 300 determines the set velocity as the limit velocity (607). In contrast, when the current velocity is smaller than the set velocity, the controller 300 determines the current velocity as the limit velocity (606).

The controller 300 may control at least one of the accelerator 230 and the braking device 220 based on the determined limit velocity (608). In detail, the controller 300 may control at least one of the accelerator 230 and the braking device 220 such that the vehicle 10 travels at the limit velocity. When the current velocity of the vehicle 10 is less than the limit velocity, the controller 300 may control the accelerator 230 to accelerate to the limit velocity. In addition, the controller 300 may control the braking device 220 such that the current velocity does not exceed the limit velocity.

Figure 5:
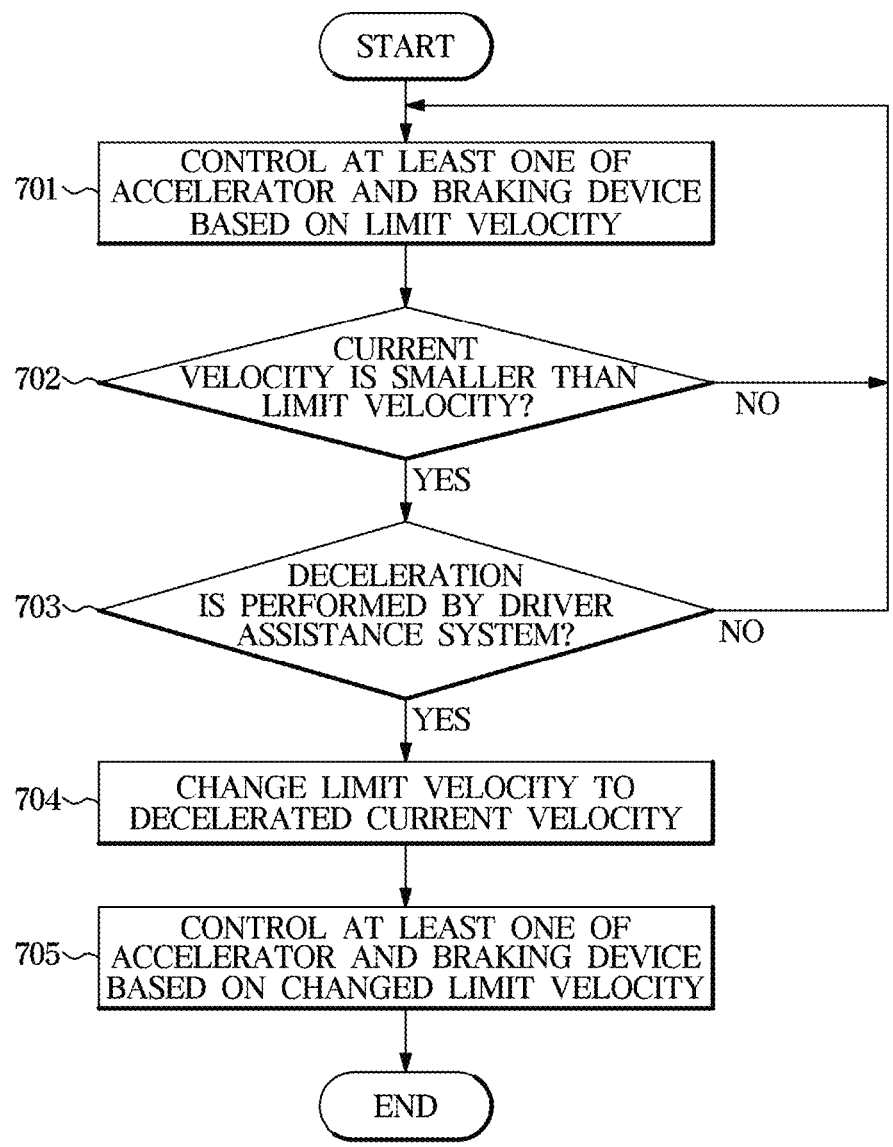
FIG. 5 illustrates a flowchart of a method of changing a velocity limit when deceleration occurs by a control method of a vehicle according to an embodiment of the disclosure.

FIG. 5 illustrates a flowchart of a method of changing a velocity limit when deceleration occurs by a control method of a vehicle according to an embodiment of the disclosure.

The method illustrated in FIG. 5 is a continuation from the method illustrated in FIG. 4. Referring to FIG. 5, the controller 300 controls at least one of the accelerator 230 and the braking device 220 based on the determined limit velocity (701). The controller 300 determines whether the deceleration is performed by the driver assistance system 250 when the vehicle 10 is driving at the limit velocity and the current velocity becomes smaller than the limit velocity due to the deceleration (702, 703).

When deceleration is performed by the driver assistance system 250, the controller 300 changes the limit velocity to the decelerated current velocity (704). The changed limit velocity may be defined as a second limit velocity. The controller 300 controls at least one of the accelerator 230 and the braking device 220 based on the changed limit velocity (second limit velocity) (705).

However, when the current velocity is equal to the limit velocity (first limit velocity) or when deceleration is not performed by the driver assistance system 250, the controller 300 does not change the limit velocity.

The deceleration by the driver assistance system 250 may be performed in various situations. In an example, the driver assistance system 250 may slow down to maintain distance from the preceding vehicle, slow down to enter the forward curve, and slow down to avoid collision with other vehicles. In other words, the case where the deceleration is performed by the driver assistance system 250 may be referred to as a case where a collision risk is detected. An accident may occur when the vehicle 10 is accelerated again in a situation where a collision risk is detected. Therefore, in order to ensure safety, when deceleration is performed by the driver assistance system 250, the controller 300 changes the limit velocity to the decelerated current velocity. In addition, the controller 300 controls the accelerator 230 and the braking device 220 not to exceed the changed limit velocity (second limit velocity).

The vehicle and the control method thereof according to one aspect of the disclosure may provide a warning by detecting the driver's carelessness status and control a vehicle's velocity to prevent a collision and minimize damage in a situation where the driver's carelessness status is detected.

More specifically, the vehicle and the control method thereof according to one aspect of the disclosure may change the limit velocity depending on deceleration by driver assistance system when the driver's carelessness status is detected. The vehicle and the control method thereof may control the velocity of the vehicle so as not to exceed the changed limit velocity. Therefore, the probability of collision avoidance is increased and damage can be reduced even in a collision.

The disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. In an example, the computer-readable recording medium may be ROM, RAM, a magnetic tape, a magnetic disc, flash memory, an optical data storage device, etc.

The embodiments of the disclosure have thus far been described with reference to the accompanying drawings. It should be understood to those of ordinary skill in the art that the disclosure may be practiced in other forms than the embodiments as described above without changing the technical idea or essential features of the disclosure. The above embodiments are only byway of example, and should not be interpreted in a limited sense.

What is claimed is:

1. A vehicle comprising:
a driver assistance system;
an accelerator configured to perform acceleration of the vehicle;
a braking device configured to perform deceleration of the vehicle;
a velocity sensor configured to detect a current velocity of the vehicle;
a driver status sensor configured to acquire a driver's behavioral data; and
a controller configured to identify a carelessness status of the driver based on the driver's behavioral data and to activate a velocity control mode to control at least one of the accelerator or the braking device when the carelessness status of the driver is detected in an activation status of the driver assistance system,
wherein the controller is configured to
compare a set velocity by the driver, a predetermined reference velocity, and the current velocity according to activation of the velocity control mode,
determine a smallest value among the set velocity, the reference velocity, and the current velocity as a limit velocity, and
control at least one of the accelerator or the braking device based on the limit velocity.

2. The vehicle according to claim 1, wherein the controller is configured to deactivate the velocity control mode when the driving will of the driver is detected after the carelessness status of the driver is detected.

3. The vehicle according to claim 1, wherein the controller is configured to determine whether the deceleration is performed by the driver assistance system when the current velocity becomes smaller than the limit velocity due to deceleration while driving at the limit velocity and to change the limit velocity to a decelerated current velocity when the deceleration is performed by the driver assistance system.

4. The vehicle according to claim 1, further comprising:
a warning device configured to provide at least one of a visual warning, an auditory warning, or a tactile warning,
wherein the controller is configured to control the warning device to output at least one of the visual warning, the auditory warning, or the tactile warning about the carelessness status of the driver.

5. The vehicle according to claim 1, wherein the controller is configured to identify at least one of a case in which a hands off from a steering wheel is detected, a case in which a drowsiness state of the driver is detected, or a case in which the driver does not look ahead for a predetermined time as the carelessness status of the driver.

6. A control method of a vehicle, comprising:
checking an activation status of a driver assistance system;
acquiring a driver's behavioral data;
identifying a carelessness status of the driver based on the driver's behavioral data;
activating a velocity control mode to control at least one of an accelerator or a braking device when the carelessness status of the driver is detected;
comparing a set velocity by the driver, a predetermined reference velocity, and a current velocity;
determining a smallest value among the set velocity, the reference velocity, and the current velocity as a limit velocity; and
controlling at least one of the accelerator or the braking device based on the limit velocity.

7. The control method according to claim 6, further comprising:
deactivating the velocity control mode when the driving will of the driver is detected after the carelessness status of the driver is detected.

8. The control method according to claim 6, further comprising:
determining whether a deceleration is performed by the driver assistance system when the current velocity becomes smaller than the limit velocity due to deceleration while driving at the limit velocity; and
changing the limit velocity to a decelerated current velocity when the deceleration is performed by the driver assistance system.

9. The control method according to claim 6, further comprising:
controlling a warning device to output at least one of a visual warning, an auditory warning, or a tactile warning about the carelessness status of the driver.

10. The control method according to claim 6, wherein the identifying the carelessness status of the driver comprises:

identifying at least one of a case in which a hands off from a steering wheel is detected, a case in which a drowsiness state of the driver is detected, or a case in which the driver does not look ahead for a predetermined time as the carelessness status of the driver.

* * * * *